Feb. 26, 1957 F. G. HOUGH 2,782,946
POWER LOADERS
Filed July 22, 1954 7 Sheets-Sheet 1

INVENTOR
FRANK G. HOUGH
ATTORNEY

Feb. 26, 1957 — F. G. HOUGH — 2,782,946
POWER LOADERS
Filed July 22, 1954 — 7 Sheets-Sheet 2

INVENTOR
FRANK G. HOUGH
ATTORNEY

Feb. 26, 1957  F. G. HOUGH  2,782,946
POWER LOADERS
Filed July 22, 1954  7 Sheets-Sheet 4

INVENTOR
FRANK G. HOUGH
ATTORNEY

Feb. 26, 1957   F. G. HOUGH   2,782,946
POWER LOADERS

Filed July 22, 1954   7 Sheets-Sheet 7

FIG. 17

INVENTOR
FRANK G. HOUGH
Paul O. Pippel
ATTORNEY

United States Patent Office 2,782,946
Patented Feb. 26, 1957

2,782,946
POWER LOADERS

Frank G. Hough, Highland Park, Ill., assignor to The Frank G. Hough Co., a corporation of Illinois Application July 22, 1954, Serial No. 445,073

12 Claims. (Cl. 214—140)

This invention relates generally to power loaders, and more specifically, to a novel hydraulic valve system and a novel hydraulic ram-porting arrangement in a novel arrangement with a power loader.

Power loaders, as are generally known in the art, comprise a wheeled vehicle or crawler tractor having a digging bucket movably mounted thereon and projecting from the forward end of the vehicle or tractor. The loader is capable of digging into material with the cutting edge of the bucket, of carrying the material loaded into the bucket, and of dumping the material from the bucket. The position of the digging bucket of these power loaders is usually controlled by at least one pair of hydraulic rams, which are in turn controlled by the operator through a hydraulic valve system. The operator adjusts the hydraulic valve system to various degrees of operation to provide for the various positions of the bucket, such as the digging position, the carrying position, and the dumping position. It has been generally found in the art that considerable skill is required by the operator of the loader in the operation of the hydraulic valve system to accurately and efficiently cause the digging bucket to assume the digging position. This has resulted from the fact that the pair of hydraulic rams which cooperate with the bucket have to be stopped at some position between the extremes of operation thereof in order to assume the digging position, and oftentimes it is difficult for an operator to know exactly what point in the operation of the hydraulic valve system the bucket will be properly positioned to dig. Therefore, it is the object of this invention to provide a hydraulic valve system which is operable to automatically index the bucket in the dig position from any other operated position of the bucket.

It is a further object of this invention to provide a novel power loader arrangement wherein the loader may be efficiently and accurately operated.

A feature of the present invention is the use of an hydraulic ram having three ports.

Other objects and features of the present invention will be apparent upon a perusal of the following specification and drawings, of which.

The present embodiments are the preferred embodiments, but it is to be understood that changes can be made in the present embodiments by one skilled in the art without departing from the spirit and scope of this invention.

For a detailed description of the loader shown in Figures 1 through 14, reference is made thereto. The loader comprises a wheeled vehicle 10, a bucket 11, a boom 12, a link 13, a hydraulic ram 14, a yoke 15, a hydraulic ram 16, and a hydraulic valve mechanism 17.

The vehicle 10 comprises a frame 18, four wheels 19, and a body 20. The body 20 comprises a forward operator's compartment and a rearwardly disposed engine compartment. Suitable controls are provided in the operator's compartment for operation of the loader.

Figures 1, 2:
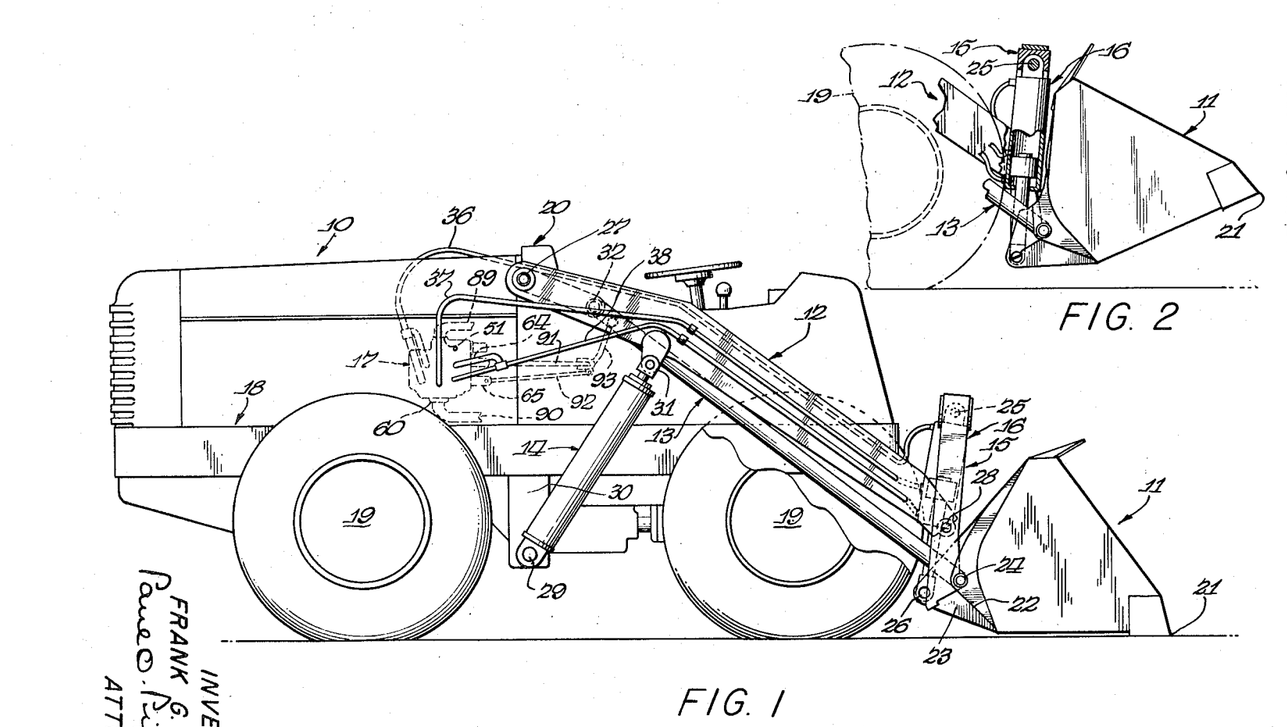
Figure 1 is a side-plan view of a power loader constructed according to the present invention, with the bucket shown in the dig position.
Figure 2 is a fragmentary side-plan view of the loader with the bucket in one carrying position.

The bucket 11 may be of any type well-known in the art, and is provided with a cutting edge 21. The rear of the bucket 11 is provided with a pair of vertical flanges 22. The flanges 22 are positioned on the rear of bucket 11 substantially at each side thereof. The bucket 11 is further provided with a vertical flange 23 mounted on the rear thereof between the pair of flanges 22. The yoke 15, which is generally U-shaped, is pivotally mounted at each end thereof to one of the flanges 22 by means of the mounting means 24. The head end of the cylinder of the hydraulic ram 16 is pivotally mounted within the yoke 15 substantially at the top thereof by means of mounting means 25. The piston of the hydraulic ram 16 is pivotally mounted to the flange 23 by means of mounting means 26. The boom 12, which is formed in duplicate portions disposed on either sides of the vehicle 10, is pivotally mounted to the frame 18 through the body 20 of the vehicle 10 by mounting means 27. Mounting means 27 is positioned substantially at the top of the body 20. The boom 12 is then positioned to extend forwardly of the vehicle 10 and is bowed in a slightly downward direction. The other end of the boom 12 is pivotally mounted to each leg of the U-shaped yoke 15 intermediate the ends thereof by means of mounting means 28. The hydraulic ram 14, which is formed in duplicate portions disposed on either side of the vehicle 10, and which is provided for raising and lowering of the boom 12, is pivotally mounted by means of mounting means 29 to the frame 18 through a supporting element 30. The other end of the hydraulic ram 14 is pivotally mounted to the boom 12 intermediate the ends thereof by means of mounting means 31. The link 13, which is also formed in duplicate portions disposed on either side of the vehicle 10, is pivotally mounted at one end thereof to the frame 18 through the body 20 of the tractor 10 by mounting means 32. Mounting means 32 is positioned substantially at the top of the body 20 forwardly of mounting means 27. The other end of the link 13 is pivotally mounted to the flanges 22 through mounting means 24. Thus it can be seen that as the ram 14 is extended, the boom 12 is pivoted about mounting means 27 to raise the bucket 11 through the yoke 15. Because of the horizontal displacement between the mounting means 27 and 32 substantially at the top of the body 20, and because of the positions of the mounting means 28 and 24, with the hydraulic ram 16 maintained in one position, there will result an automatic tilt-back of the bucket 11 as the boom is raised to a position before the bucket 11 obstructs the operator's forward vision, and an automatic forward tilt of the bucket 11 as the boom 12 is raised further above the forward vision of the operator of the loader. It may be noted that when the bucket 11 is in the dig position, as shown in Figure 1, a plane through the mounting means 27 and 28 will intersect a plane through the mounting means 32 and 24.

Figure 7:
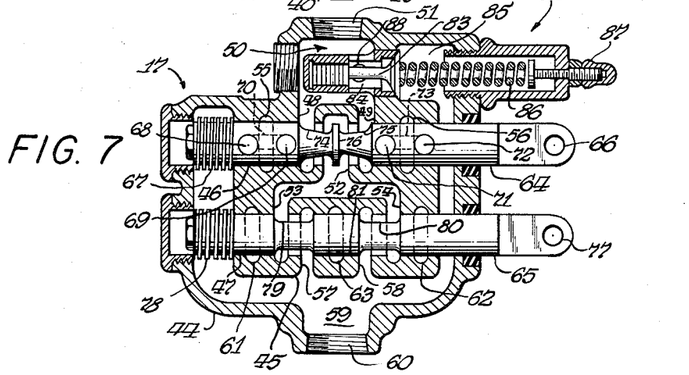
Figure 7 is a cross-sectional view of the valve assembly in another operated position.

It can further be seen that as the hydraulic ram 14 functions to operate the boom 12, the hydraulic ram 16 will function to tilt the bucket 11 relative to the boom 12 and the link 13. The hydraulic system for operation of the hydraulic ram 14 (not shown) may be of any type well-known in the art. The hydraulic system for the operation of the hydraulic ram 16 will next be described with reference to Figures 1 through 14, and particular reference to Figures 5 through 14. The cylinder of the hydraulic ram 16 is provided with three ports 33, 34, and 35. The ports 33 and 35 are disposed one at each end of the cylinder. The port 34 is disposed longitudinally of the cylinder a distance from the rod end of the cylinder corresponding to the amount of tilt required of the bucket 11 from that end, the dump end, to the dig position. The piston head of the piston of the hydraulic cylinder 16 is of a depth sufficient to close the port 34 when disposed thereover. The three ports 33, 34 and 35 of the hydraulic cylinder 16 are interconnected with the valve assembly 17 through three hydraulic fluid conduits 36, 37, and 38. The conduits 36, 37, and 38 are not shown accurately in length and disposition in the various drawings, in order to prevent confusion of the various other elements and to clearly show their end connections. The valve assembly end of conduit 36 is branched to connect in parallel to ports 39 and 40 of the valve assembly 17. The valve assembly end of conduit 37 is connected to port 41 of the valve assembly 17. The valve assembly end of conduit 38 is branched to connect in parallel to ports 42 and 43 of the valve assembly 17. Valve assembly 17 comprises an outer casing 44 through which the ports 39 through 43 are formed. A valve body 45 is disposed within the valve casing 44. The valve body 45 is provided with a pair of cylindrical bores 46 and 47. Cylindrical bore 46 is provided with two interconnected annular cavities 48 and 49. The interconnected annular cavities 48 and 49 are connected to a chamber 50. Port 51 through the casing 44 opens into chamber 50. Cylindrical bore 46 is further provided with an annular cavity 52 which is disposed between the annular cavities 48 and 49. Cylindrical bore 47 is provided with two annular cavities 53 and 54. Annular cavities 52, 53, and 54 are connected within the valve body 45. Cylindrical bore 46 is further provided with another pair of annular cavities 55 and 56. Annular cavity 55 is connected through the valve body 45 to port 39. Annular cavity 56 is connected through the valve body 45 to the port 42. Cylindrical bore 47 is further provided with another pair of annular cavities 57 and 58 positioned between the annular cavities 53 and 54. Annular cavities 57 and 58 are connected into valve chamber 59. Valve chamber 59 is somewhat U-shaped, as can easily be seen in the drawings. A port 60 is provided through the casing 44 directly into valve chamber 59. Cylindrical bore 47 is further provided with a third pair of annular cavities 61 and 62. The annular cavities 61 and 62 are positioned substantially at each end of cylindrical bore 47. Annular cavity 61 is directly connected through the valve body 45 to port 40. Annular cavity 62 is directly connected through the valve body 45 to port 43. Cylindrical bore 47 is further provided with an annular cavity 63 which is disposed between annular cavities 57 and 58. Annular cavity 63 is directly connected through valve body 45 to port 41. Valve plunger 64 is slidably mounted within cylindrical bore 46, and valve plunger 65 is slidably mounted within cylindrical bore 47. One end of valve plunger 64 projects from the casing 44 and is provided with a mounting hole 66. The other end of valve plunger 64 projects into valve chamber 59 and is provided therein with a spring 67. The spring 67 biases the valve plunger 64 to the neutral position, as shown in Figure 7. The valve plunger 64 is further provided with two independent passage means. One of the passage means comprises a pair of diametric passages 68 and 69 interconnected intermediate the ends thereof by an axial passageway 70. The other passage means comprises a second pair of diametric passages 71 and 72 interconnected intermediate the ends thereof by an axial passage 73. The valve plunger 64 is further provided with a pair of annular grooves 74 and 75 separated by land 76. The valve plunger 65 is positioned to have one end thereof projecting from the valve casing 44. This end is provided with a hole 77 for connection of operating means for the valve plunger 65. The other end of the valve plunger 65 projects into valve chamber 59 and is provided with a spring 78. The spring 78 biases the valve plunger 65 to the neutral position, as shown in Figure 7. Valve plunger 65 is further provided with a pair of annular grooves 79 and 80 separated by a land 81.

The valve assembly 17 is further provided with a pressure-relief valve mechanism 82 which comprises a valve plunger 83 having a valve head and valve stem, a valve plunger chamber 84, a spring chamber 85, a spring 86, and spring-adjusting means 87. The spring 86 is mounted between the valve head of the valve plunger 83 and the spring-adjusting means 87 to bias the valve plunger 83 against a valve seat between the valve plunger chamber 84 and the spring chamber 85. The valve plunger chamber 84 is provided with an opening 88 therethrough into valve chamber 50. The spring chamber 85 is interconnected with the valve chamber 59. Thus, it can easily be seen that if a pressure differential exists between valve chamber 50 and valve chamber 59 which is above a certain value determined by the tension in spring 86, the valve plunger 83 will be moved from its seat, thereby directly communicating the valve chamber 50 with valve chamber 59.

From the preceding description of the pressure-relief valve mechanism 82, it is obvious that the port 51 is intended as the high-pressure hydraulic fluid-supply port, and port 60 is intended to be the low-pressure hydraulic fluid-return line connection. The port 51 is connected to a hydraulic line 89 which is in turn connected to a hydraulic fluid pump (not shown). The port 60 is connected to a hydraulic line 90 which is in turn connected to a hydraulic fluid reservoir (not shown). The hydraulic fluid pump and reservoir may be of any type well-known in the art.

The valve plunger 64 and the valve plunger 65 are connected through levers 91 and 92, respectively, to a lever 93 mounted within the operator's compartment of the body 20. The lever 93 is movable to position the valve plungers 64 and 65 in the five positions shown in Figures 5, 7, 9, 11, and 13.

Figure 8:
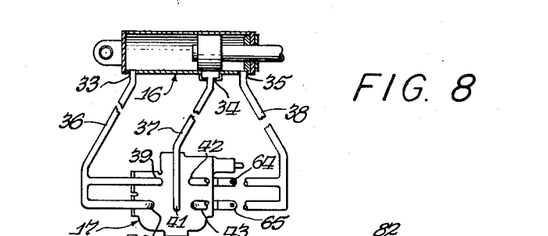
Figure 8 is a plan view of the valve assembly shown in Figure 7, with the addition of the hydraulic ram in cross section in an operated position coresponding to the operated position shown in Figure 7.

In order that the specific cooperation existing between the various elements of the valve assembly 17 may be clearly understood, a detailed description of the operation of the valve assembly to each of the noted five positions will be next discussed. Reference is first made to Figures 1, 7, and 8. Figure 7 shows the initial neutral position of the valve assembly 17. Assume that all of the hydraulic fluid conduits and the hydraulic ram 16 are filled with a hydraulic fluid. In this position, the annular cavities 55, 56, 61, 62, and 63 are closed from communication with ports 39, 42, 40, 43, and 41, respectively, by the valve plungers 64 and 65. The hydraulic fluid may not then flow from any of the ports 33, 34, and 35, and the piston of the hydraulic ram 16 will remain in the position shown in Figure 8. The hydraulic fluid pumped into the port 51 will pass through valve chamber 50, annular cavities 48 and 49, annular grooves 74 and 75, annular cavity 52, annular cavities 53 and 54, annular grooves 79 and 80, annular cavities 57 and 58, valve chamber 59, to and through port 60. Assuming the hydraulic ram 14 is contracted as shown in Figure 1, the shovel 11 will then be disposed in the digging position, as shown in Figure 1.

Figure 9:
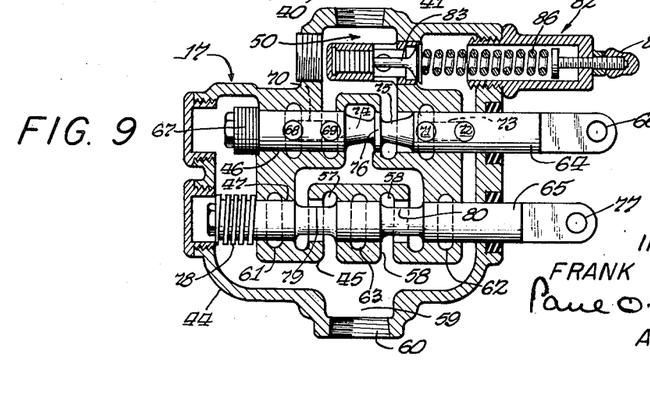
Figure 9 is a cross-sectional view of the valve assembly shown in another operated position.
Figure 10:
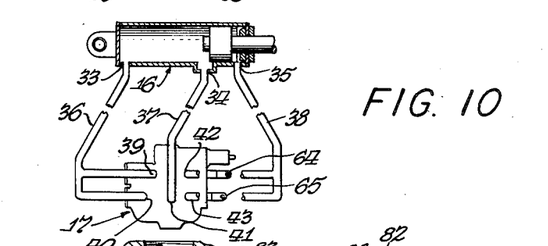
Figure 10 is a plan view of the valve assembly shown in Figure 9, with the addition of the hydraulic ram in cross section in an operated position corresponding to the operated position shown in Figure 9.
Figure 11:
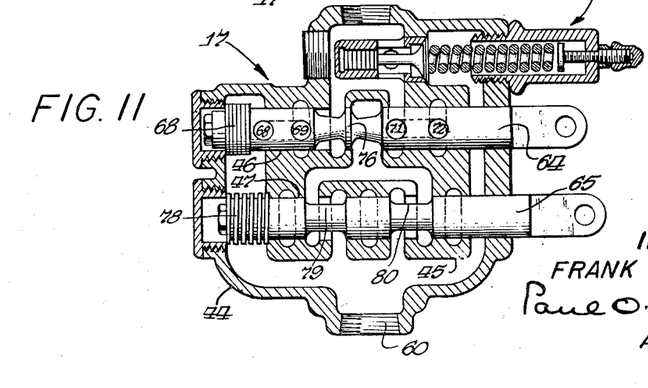
Figure 11 is a cross-sectional view of the valve assembly in a fourth operated position.
Figure 12:
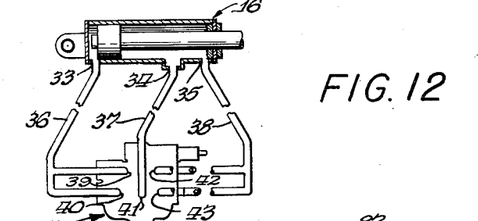
Figure 12 is a plan view of the valve assembly shown in Figure 11, with the addition of the hydraulic ram in cross section in an operated position corresponding to the operated position shown in Figure 11.

Assuming next that the lever 93 is operated to cause the valve plungers 64 and 65 to assume the positions shown in Figure 9. When this is done, the hydraulic fluid pumped through port 51 under high-pressure will flow through valve chamber 50, annular cavity 48, diametric passage 69, axial passage 70, diametric passage 68, annular cavity 55, port 39, conduit 36, port 33 at the head end of the cylinder of hydraulic ram 16, and into the cylinder to tend to force the piston head of the piston of the hydraulic ram 16 toward the rod end of the cylinder thereof. The piston rod of the hydraulic ram 16 will then move to tip the shovel 11 to the carrying position, as shown in Figure 2, as hydraulic fluid will flow from the rod end of the cylinder of the hydraulic ram 16 through port 35, conduit 38, port 42, annular cavity 56, diametric passage 71, axial passage 73, diametric passage 72, valve chamber 59, to and through port 60. Annular cavities 61, 63, and 62 are checked or closed from ports 40, 41, and 43, respectively, by the valve plunger 65.

Figure 13:
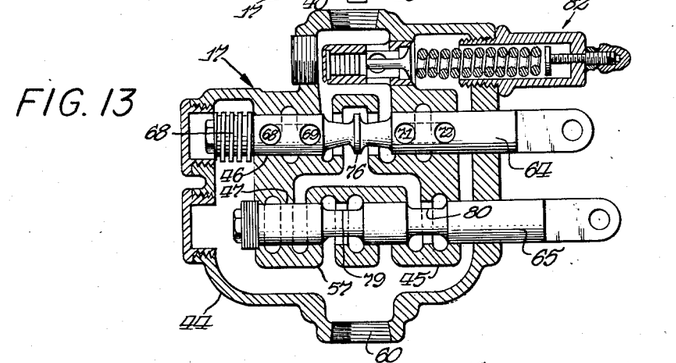
Figure 13 is a cross-sectional view of the valve assembly in a fifth operated position.
Figure 14:
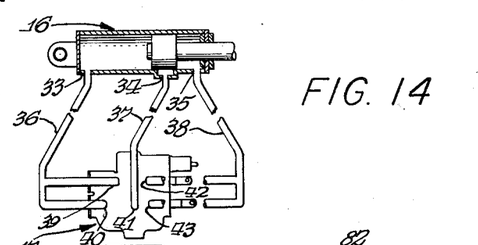
Figure 14 is a plan view of the valve assembly shown in Figure 13, with the addition of the hydraulic ram in cross section in an operated position coresponding to the operated position shown in Figure 13.

The bucket 11 may again be returned to the dig position from the above-described carrying position by operating the lever 93 to cause the valve plungers 64 and 65 to assume the positions shown in Figure 13. When this is done, annular cavities 55 and 61 will be checked or closed from ports 39 and 40, respectively, by valve plungers 64 and 65. Therefore, no hydraulic fluid may escape from the head end of the cylinder of the hydraulic ram 16 through port 33. High-pressure hydraulic fluid will then pass through port 51, through valve chamber 50, annular cavities 48 and 49, annular grooves 74 and 75, annular cavity 52, annular cavity 54, annular groove 80, annular cavity 62, port 43, conduit 38, port 35, to the rod end of the cylinder of the hydraulic ram 16. The high-pressure hydraulic fluid will then tend to move the piston of the hydraulic ram 16 toward the head end of the cylinder thereof. The piston will so move as hydraulic fluid will then flow from the head end of the hydraulic cylinder of the hydraulic ram 16, through port 34, conduit 37, port 41, annular cavity 63, annular groove 79, annular cavity 57, valve chamber 59, to and through port 60. The piston of the hydraulic ram 16 will move toward the head end of the cylinder thereof until the piston head closes port 34, as shown in Figure 14. The piston will then stop accurately indexed in the dig position. Annular cavity 56 is closed from port 42 by valve plunger 64. The bucket 11 may be returned to the carrying position, as shown in Figure 2, by again operating the lever 93 to cause the valve plungers 64 and 65 to assume the positions shown in Figure 9.

Figures 3, 4:
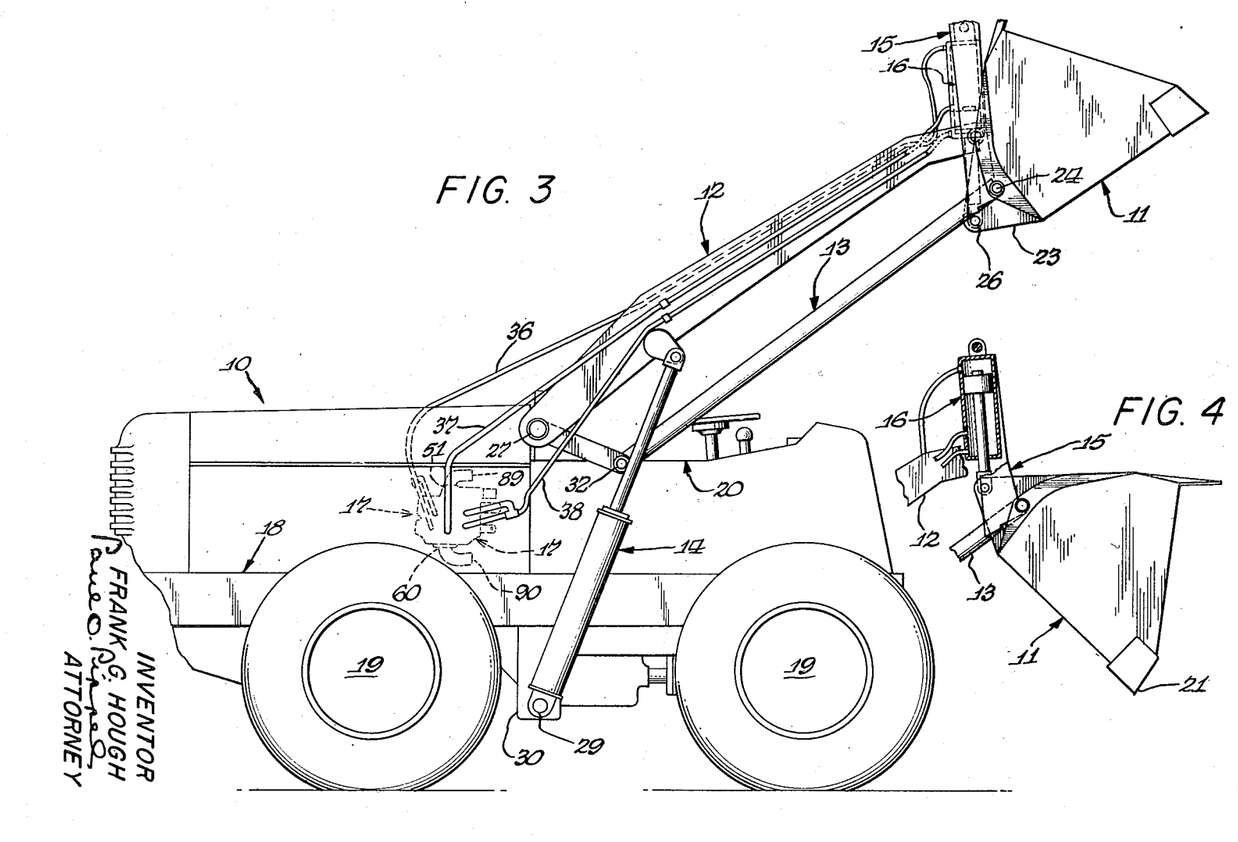
Figure 3 is a side-plan view of a loader with the bucket in the high-lift carrying position.
Figure 4 is a fragmentary side-plan view of the loader with the bucket in the high-lift dump position.

From the carrying position shown in Figure 2, hydraulic ram 14 may be extended to raise the bucket 11 to the position shown in Figure 3. From that or any intermediate position, the bucket 11 may be moved to the dump position, as shown in Figure 4, by an operation of the lever 93 to cause the valve plungers 64 and 65 to assume the positions shown in Figure 11. In this operation, annular cavities 61, 62, and 63 are closed from ports 40, 43, and 41, respectively, by the valve plunger 65, as previously described for Figure 9. Thus no hydraulic fluid can escape from the rod end of the cylinder of the hydraulic ram 16 through port 34. High-pressure hydraulic fluid will then flow through port 51, valve chamber 50, annular cavity 49, diametric passage 71, axial passage 73, diametric passage 72, annular cavity 56, port 42, conduit 38, port 35, into the rod end of the cylinder of the hydraulic ram 16. This will tend to move the piston of the hydraulic ram 16 toward the head end of the cylinder thereof. The piston of the hydraulic ram 16 will move to the head end of the cylinder thereof to operate the bucket 11 to the position shown in Figure 4, as the hydraulic fluid in the head end of the cylinder of the hydraulic ram 16 will flow through port 33, conduit 36, port 39, annular cavity 55, diametric passage 69, axial passage 70, diametric passage 68, valve chamber 59, to and through port 60.

Figures 5, 6:
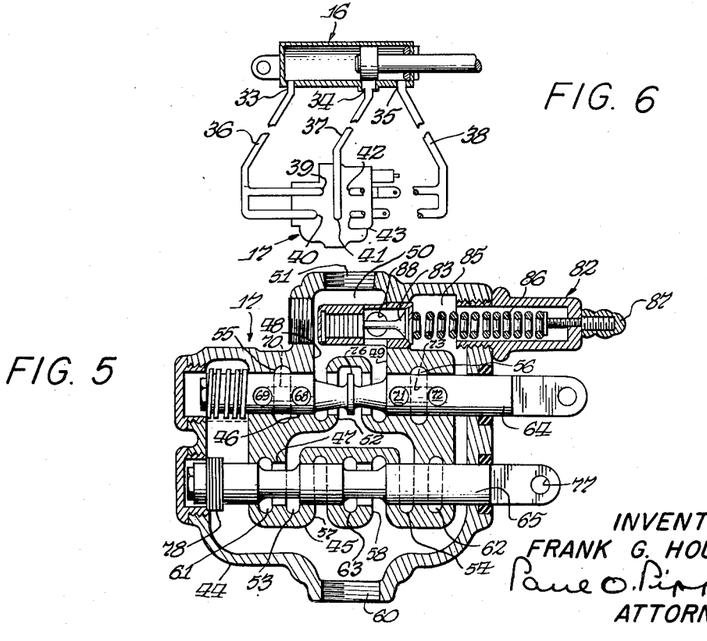
Figure 5 is a cross-sectional view of the valve assembly in one operated position.
Figure 6 is a plan view of the valve assembly shown in Figure 5, with the addition of the hydraulic ram in cross section in an operated position coresponding to the operated position shown in Figure 5.

To return the bucket 11 from the dump position (as shown in Figure 4) to the dig position, even though the hydraulic ram 14 will be extended (as shown in Figure 3), the lever 93 is operated to move the valve plungers 64 and 65 to the position shown in Figure 5. Annular cavities 55 and 56 are then closed from ports 39 and 42, respectively, by the valve plunger 64, and annular cavity 62 is closed from port 43 by valve plunger 65. Thus conduit 38 is a checked fluid line. High-pressure hydraulic fluid will pass through port 51, valve chamber 50, annular cavities 48 and 49, annular grooves 74 and 75, annular cavity 52, annular cavity 53, annular groove 79, annular cavity 61, port 40, conduit 36, port 33, into the head end of the cylinder of the hydraulic ram 16. This will tend to move the piston within the cylinder of the hydraulic ram 16 toward the rod end thereof. Hydraulic fluid will flow from the rod end of the hydraulic cylinder of the ram 16 through port 34, conduit 37, port 41, annular cavity 63, annular groove 80, annular cavity 58, valve chamber 59, to and through port 60. This flow will continue until the piston head of the piston of the hydraulic ram 16 closes port 34, as shown in Figure 6. No hydraulic fluid may escape through port 35 since conduit 38 is checked, as previously noted. The bucket 11 will then be accurately indexed to the dig position; and from that position, the bucket may again be moved to the carrying position, and further, to the dump position, as previously described.

To next describe the embodiment of the present invention shown in Figures 15 through 18, reference is made thereto. In the embodiment shown in these figures, a crawler tractor 100 is provided. The track mechanism of the tractor 100 comprises a track frame 101. A pair of supporting frames 102 are mounted to the track frame 101 on each side of the tractor 100. A shovel 103 is provided. The shovel 103 is provided with a pair of vertical flanges 104 mounted on the rear side thereof. A boom 105 is provided in duplicate portions. Each portion of the boom 105 is pivotally mounted at one end thereof to one of the supporting frames 102 by means of mounting means 106. The other end of each portion of the boom 105 is pivotally mounted to the lower edge of the pair of flanges 104 by means of mounting means 107. A pair of hydraulic rams 108 are provided for raising and lowering of the boom 105. The hydraulic rams 108 are pivotally mounted on each side of the tractor 100 to the supporting frame 102 by means of mounting means 109. The other ends of the hydraulic rams 108 are pivotally mounted to the boom 105 intermediate the ends thereof by means of mounting means 110. A second pair of hydraulic rams 111 are provided. The pair of hydraulic rams 111 are similar to the hydraulic ram 16, previously described. However, the pair of hydraulic rams 111 are different in that the third port of each is positioned closer to the head ends of the cylinders thereof than to the rod ends thereof. The other ports of the hydraulic rams 111 are ports 113 at the head ends of the cylinder thereof, and ports 114 at the rod ends of the cylinder thereof. A pair of links 116 are mounted to the ends of the piston rods of the hydraulic rams 111 and the other ends of the links 116 are pivotally mounted to the upper edge of the flanges 104. The other end of each of the hydraulic rams 111 is pivotally mounted to one of the supporting frames 102 diagonally rearwardly above the mounting means 106 by mounting means 117, as can easily be seen in Figure 15. The hydraulic valve assembly 17 is mounted within the body of the tractor 100. Hydraulic fluid conduit 118 is connected between port 113 of ram 111 on the right side of the tractor 100, and ports 39 and 40 of the valve assembly 17. Conduit 119 is connected between port 114 on the right side of tractor 100 and ports 42 and 43 of valve assembly 17. Conduit 120 in connected between port 112 of hydraulic ram 111 on the right side of the tractor 100 and port 41 of valve assembly 17. Conduit 118 is tapped by conduit 121 which is connected to port 113 of the hydraulic ram 111 on the left side of tractor 100. Conduit 119 is tapped by conduit 122 which is connected to port 114 of the hydraulic ram 111 on the left side of the tractor 100. Conduit 120 is tapped by conduit 123 which is connected to port 112 of the hydraulic ram 111 on the left side of the tractor 100. It can thus be seen that conduits 118 and 121 are similar to the previously described conduit 36, while conduits 119 and 122 are similar to the previously described conduit 38, and conduits 120 and 123 are similar to the previously described conduit 37. Lever 93 is also provided operable through levers 91 and 92 to selectively move valve plungers 64 and 65.

Figures 15, 16:
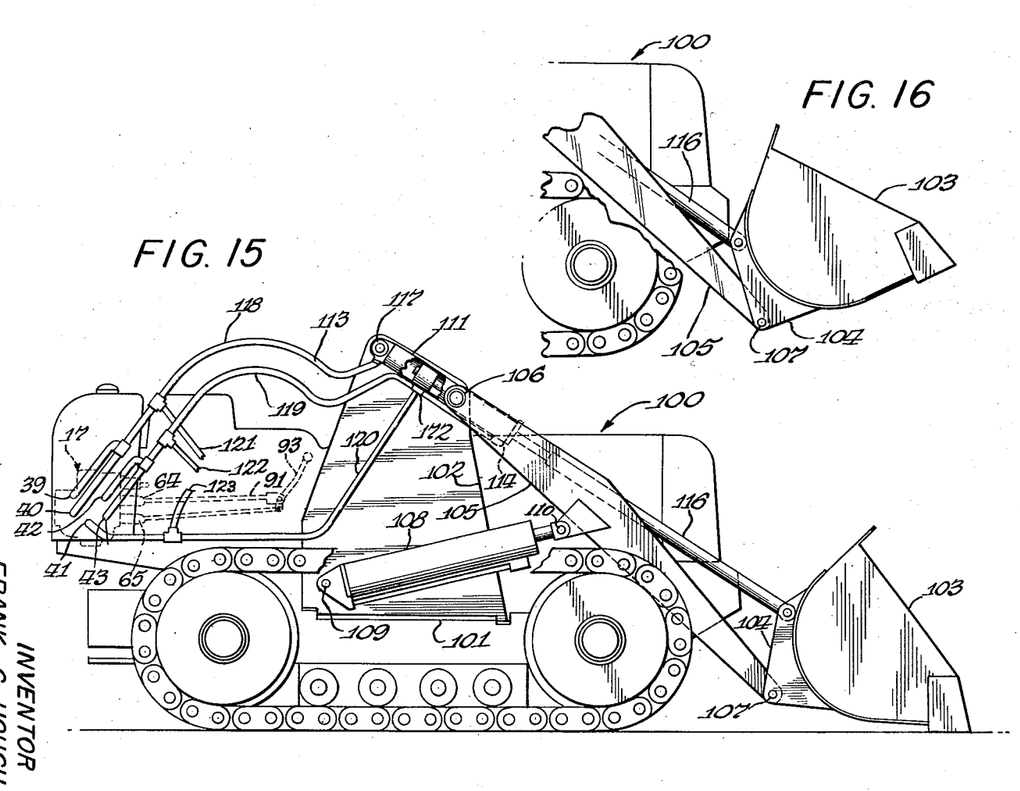
Figure 15 is a side-plan view of another embodiment of the present invention, with the bucket in the dig position.
Figure 16 is a fragmentary side-plan view of the second embodiment of the loader, with the bucket in the carrying position.
Figure 17:
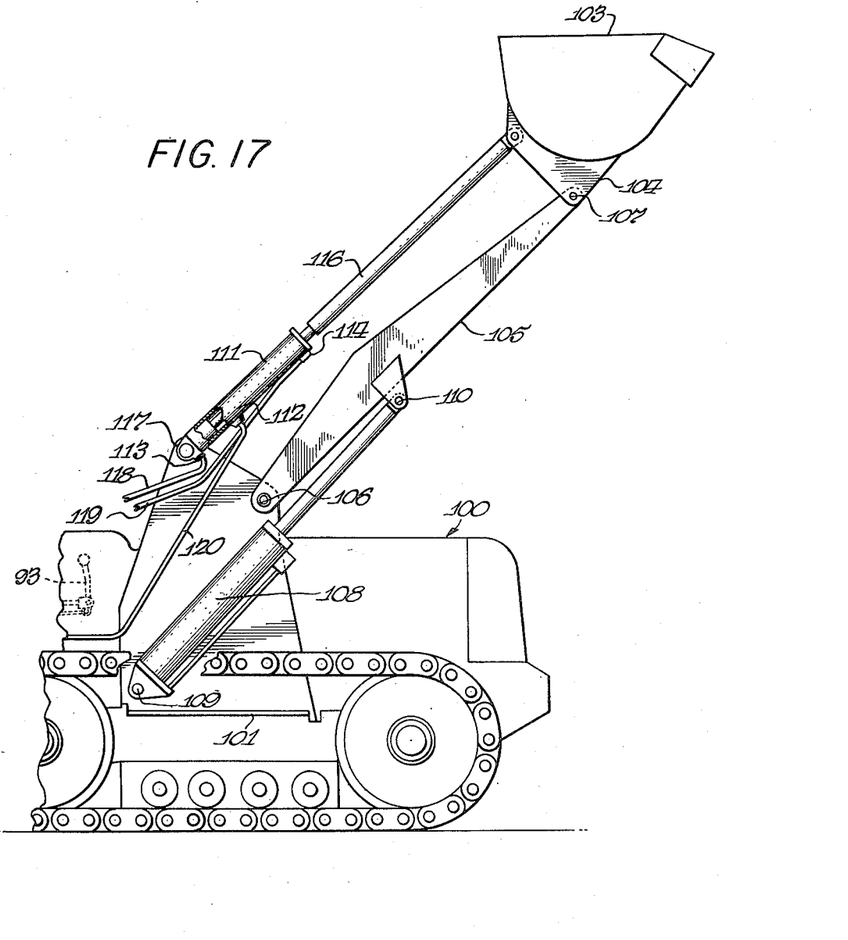
Figure 17 is a fragmentary side-plan view of the second embodiment of the loader, with the bucket in the high-lift carrying position.
Figure 18:
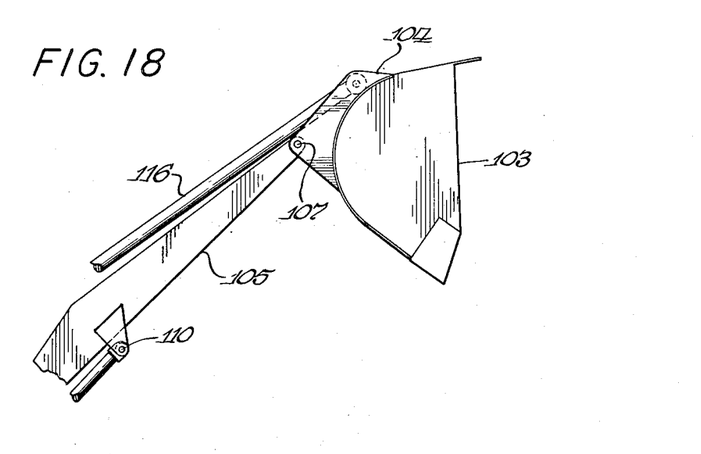
Figure 18 is a fragmentary side-plan view of the loader with the bucket in the high-lift dump position.

When the valve assembly 17 is in the initial neutral position (as shown in Figure 7), the hydraulic rams 111 will maintain the position shown in Figure 15. Hydraulic fluid may not then flow from any of the ports 112, 113, or 114. The bucket 103 may then be tipped back to the carry position, such as shown in Figure 16, by operating the lever 93 to cause the valve plungers 64 and 65 to assume the positions shown in Figure 11. Conduits 118 and 121 are then low-pressure hydraulic fluid lines. Conduits 119 and 122 are then high-pressure hydraulic fluid lines, while conduits 120 and 123 are checked fluid lines. To return the bucket 11 from the carrying position shown in Figure 16 to the dig position shown in Figure 15, the lever 93 is operated to cause the valve plungers 64 and 65 to assume the position shown in Figure 5. Conduits 118 and 121 are then high-pressure hydraulic fluid lines. Conduits 120 and 123 are low-pressure hydraulic fluid lines, while conduits 119 and 122 are checked hydraulic fluid lines. The bucket 103 may then be moved to the carrying position shown in Figure 16 by operating the lever 93 to cause the valve plungers 64 and 65 to assume the positions shown in Figure 11. The bucket 103 may then be raised to the position shown in Figure 17 by an extension of the ram 108. From the latter, or any intermediate position, the bucket 103 may be pivoted to the dump position shown in Figure 18 by an operation of the lever 93 to cause the valve plungers 64 and 65 to assume the positions shown in Figure 9. Conduits 118 and 121 are then high-pressure hydraulic fluid lines. Conduits 119 and 122 are then low-pressure hydraulic fluid lines, while conduits 120 and 123 are checked hydraulic fluid lines. From the dump position shown in Figure 18, the bucket 103 may be returned to the dig position by an operation of the lever 93 to cause the valve plungers 64 and 65 to assume the positions shown in Figure 13. Conduits 119 and 122 are then high-pressure hydraulic fluid lines. Conduits 120 and 123 are then low-pressure hydraulic fluid lines, while conduits 118 and 121 are then checked hydraulic fluid lines. It can thus be seen that the bucket 103 may be accurately and efficiently indexed to the dig position from any other operated position of the bucket 103.

Having described the invention, what is considered new and desired to be protected by Letters Patent is:

1. In a loader, a hydraulic ram having three ports formed through the cylinder thereof longitudinally thereof, a hydraulic valve for controlling the operation of said hydraulic ram, said hydraulic valve comprising a high-pressure hydraulic fluid-supply port, and a low-pressure hydraulic fluid reservoir-return port therein, a valve body having a pair of valve bores formed therein, a pair of valve plungers slidably mounted within said valve bores, said valve body having a plurality of annular cavities disposed longitudinally of said valve bores, means interconnecting certain ones of said annular cavities with said supply port and said reservoir-return port, a plurality of ports directly connected to other certain ones of said annular cavities, one of said valve plungers having a plurality of annular grooves cooperating with said annular cavities, the other of said valve plungers having a plurality of annular grooves and a plurality of pairs of diametric passages interconnected by axial passages cooperating with said annular cavities so that said valve plungers are slidable to a plurality of positions to selectively and interchangeably interconnect certain selected ones of said plurality of ports and said supply port, while interconnecting certain other ones of said plurality of ports and said reservoir-return port, and while closing the remaining ones of said plurality of ports to the passage of any hydraulic fluid therethrough, and hydraulic fluid conduit means interconnecting said hydraulic ram ports with said plurality of ports.

2. In a loader, a hydraulic ram having three ports formed through the cylinder thereof longitudinally thereof, a hydraulic valve for controlling the operation of said hydraulic ram, said valve comprising a high-pressure hydraulic fluid-supply port, and a low-pressure hydraulic fluid reservoir-return port therein, a valve body having a pair of valve bores formed therein, a pair of valve plungers slidably mounted within said valve bores, said valve body having a plurality of annular cavities disposed longitudinally of said valve bores, certain ones of said annular cavities of one of said bores directly connected to said supply port, certain ones of said annular cavities of the other of said valve bores directly connected to said reservoir-return port, other certain ones of said annular cavities directly interconnected, a plurality of ports directly connected to the remaining ones of said annular cavities, one of said pair of valve plungers having a plurality of annular grooves cooperating with said certain ones of said annular cavities directly connected to said reservoir-return port and said other certain ones of said annular cavities, the other of said pair of valve plungers having a plurality of annular grooves and a plurality of pairs of diametric passages interconnected by axial passages and cooperating with said certain ones of said annular cavities directly connected to said supply port and said other certain ones of said annular cavities so that said valve plungers are slidable to a plurality of positions to selectively and interchangeably interconnect certain selected ones of said plurality of ports and said supply port, while interconnecting certain other ones of said plurality of ports and said reservoir-return port, and while closing the remaining ones of said plurality of ports to the passage of any hydraulic fluid therethrough, and hydraulic fluid conduits interconnecting said hydraulic ram ports with said plurality of ports.

3. In a loader, a hydraulic ram comprising a longitudinal cylinder, a piston comprising a piston head and a piston rod slidably mounted within said cylinder, a first port formed through said cylinder substantially at the head end thereof, a second port formed through said cylinder substantially at the rod end thereof, and a third port formed through said cylinder intermediate the ends thereof, said piston head having a depth sufficient to close said third port when disposed thereover, a hydraulic valve for controlling the operation of said hydraulic ram, said hydraulic valve comprising a high-pressure hydraulic fluid-supply port, and a low-pressure hydraulic fluid reservoir-return port therein, a valve body having a pair of valve bores formed therein, a pair of valve plungers slidably mounted within said valve bores, said valve body having a plurality of annular cavities disposed longitudinally of said valve bores, certain ones of said annular cavities of one of said bores directly connected to said supply port, certain ones of said annular cavities of the other of said valve bores directly connected to said reservoir-return port, other certain ones of said annular cavities directly interconnected, a plurality of ports directly connected to the remaining ones of said annular cavities, one of said valve plungers having a plurality of annular grooves cooperating with said annular cavities of said other of said valve bores, the other of said valve plungers having a plurality of annular grooves and a plurality of pairs of diametric passages interconnected by axial passages cooperating with said annular cavities of said one of said valve bores so that said valve plungers are slidable to a plurality of positions to selectively and interchangeably interconnect certain selected ones of said plurality of ports and said supply port while interconnecting certain other ones of said plurality of ports and said reservoir-return port, and while closing the remaining ones of said plurality of ports to the passage of any hydraulic fluid therethrough, a hydraulic fluid conduit interconnecting said first port and said certain selected ones of said plurality of ports, a second hydraulic fluid conduit interconnecting said second port and said certain other ones of said plurality of ports, and a third hydraulic fluid conduit interconnecting said third port and said remaining ones of said plurality of ports.

4. In a loader having a vehicle, a digging bucket, a boom pivotally mounted at one end thereof on said vehicle, means pivotally connecting the other end of said boom to said bucket, link means pivotally mounted at one end thereof on said vehicle, means pivotally connecting the other end of said link means to said bucket, means for varying the degree of tilt of said bucket relative to said boom comprising a hydraulic ram comprising a longitudinal cylinder, a piston comprising a piston head and a piston rod slidably mounted within said cylinder, a first port formed through said cylinder substantially at the head end thereof, a second port formed through said cylinder substantially at the rod end thereof, and a third port formed through said cylinder intermediate the ends thereof, said piston head having a depth sufficient to close said third port when disposed thereover, said third port positioned longitudinally of said hydraulic ram so that when said piston head is positioned thereover said bucket is pivoted relative to said boom to a normal digging position, and hydraulic means connected to said first, second and third ports and operable to a plurality of positions to operate said hydraulic ram to pivot said bucket relative to said boom to a dumping position, a carrying position, and said normal digging position.

5. In a loader having a vehicle, a digging bucket, a boom pivotally mounted at one end thereof on said vehicle, means pivotally connecting the other end of said boom to said bucket, link means pivotally mounted at one end thereof on said vehicle, means pivotally connecting the other end of said link means to said bucket, means for varying the degree of tilt of said bucket relative to said boom comprising, a hydraulic ram having three ports formed through the cylinder thereof longitudinally thereof with one port positioned at each end of said cylinder and with the third port positioned at a point corresponding to a certain tilted digging position of said bucket, a hydraulic valve for controlling the operation of said hydraulic ram to tilt said bucket forwardly and rearwardly and to said certain digging position, said valve comprising a plurality of ports therein, hydraulic fluid conduits interconnecting said hydraulic ram ports with certain ones of said valve ports, and means manually operable to a plurality of positions to interchangeably cause certain selected ones of said plurality of ports to act as delivery ports for hydraulic fluid to said hydraulic ram, while causing certain other ones of said plurality of ports to act as return ports for hydraulic fluid from said ram, and while causing the remaining ones of said plurality of ports to act as checked ports for hydraulic fluid from said hydraulic ram whereby said bucket is interchangeably tilted forwardly, rearwardly and to said certain digging position.

6. In a loader having a vehicle, a digging bucket, a boom pivotally mounted at one end thereof on said vehicle, means pivotally interconnecting the other end of said boom with said digging bucket, link means pivotally connected at one end thereof on said vehicle, means pivotally connecting the other end of said link means with said bucket, means for indexing said bucket to three positions of tilt of said bucket relative to said boom, said last mentioned means comprising a hydraulic ram comprising a longitudinal cylinder, a piston comprising a piston head and a piston rod slidably mounted within said cylinder, means pivotally mounting said cylinder of said hydraulic ram to said other end of said boom, means pivotally mounting said piston of said hydraulic ram to said bucket, a first port formed through said cylinder substantially at the head end thereof, a second port formed through said cylinder substantially at the rod end thereof, and a third port formed through said cylinder intermediate the ends thereof, the longitudinal positions of said first, second and third ports substantially corresponding to said three positions of tilt, said piston head having a depth sufficient to close said third port when disposed thereover, means operable to three positions corresponding to said three positions of tilt to selectively and interchangeably deliver high-pressure hydraulic fluid to either of said first and second ports, while selectively and interchangeably removing low-pressure hydraulic fluid from another of said ports, and while checking the remaining one of said ports to the passage of any hydraulic fluid therefrom and thereto whereby said bucket is interchangeably tilted to said three positions of tilt.

7. In a loader having a vehicle, a digging bucket, a boom pivotally mounted at one end thereof on said vehicle, means pivotally interconnecting the other end of said boom with said bucket, link means pivotally mounted at one end thereof on said vehicle, means pivotally interconnecting the other end of said link means with said bucket, means for tilting said bucket to three positions relative to said boom, said last-mentioned means comprising a hydraulic ram pivotally connected between said boom and said bucket, said hydraulic ram having three ports formed through the cylinder thereof longitudinally thereof, the longitudinal positions of said three ports substantially corresponding to said three positions of tilt of said bucket, a hydraulic valve for controlling the operation of said hydraulic ram, said valve comprising a plurality of ports, hydraulic fluid conduits interconnecting said hydraulic ram ports with certain ones of said valve ports, and means manually operable to three positions corresponding to said three positions of tilt to selectively and interchangeably cause certain selected ones of said plurality of ports to act as delivery ports for hydraulic fluid to said hydraulic ram, while causing certain other ones of said plurality of ports to act as return ports for hydraulic fluid from said ram, and while causing the remaining ones of said plurality of ports to act as checked ports for hydraulic fluid from said hydraulic ram so that said bucket is selectively pivoted to said three positions of tilt.

8. In a loader having a vehicle, a digging bucket, a boom pivotally mounted at one end thereof on said vehicle, means pivotally interconnecting the other end of said boom with said bucket, link means pivotally mounted at one end thereof on said vehicle, means pivotally interconnecting the other end of said link means with said bucket, means for tilting said bucket to three positions relative to said boom, said last mentioned means comprising a hydraulic ram pivotally connected between said boom and said bucket, said hydraulic ram having three ports formed through the cylinder thereof longitudinally thereof, the longitudinal positions of said three ports corresponding to said three positions of tilt of said bucket, a hydraulic valve for controlling the operation of said hydraulic ram, said hydraulic valve comprising a high-pressure hydraulic fluid-supply port, a low-pressure hydraulic fluid-reservoir-return port, and a plurality of ports therein, hydraulic fluid conduits interconnecting said hydraulic ram ports with certain ones of said plurality of ports and means associated with said supply port, said return port, and said plurality of ports and manually operable to three positions corresponding to said three positions of tilt to selectively and interchangeably interconnect certain selected ones of said plurality of ports and said supply port, while interconnecting other certain ones of said plurality of ports and said reservoir-return port, and while closing the remaining ones of said plurality of ports to the passage of any hydraulic fluid therethrough so that said bucket is selectively tilted to said three positions of tilt.

9. In a loader having a vehicle, a digging bucket, a boom pivotally mounted at one end thereof on said vehicle, means pivotally interconnecting the other end of said boom with said bucket, extensible link means pivotally connected between said vehicle and said bucket for tilting said bucket to three positions relative to said boom, said extensible link means comprising a hydraulic ram comprising a longitudinal cylinder, a piston comprising a piston head and a piston rod slidably mounted within said cylinder, a first port formed through said cylinder substantially at the head end thereof, a second port formed through said cylinder substantially at the rod end thereof, and a third port formed through said cylinder intermediate the ends thereof, the longitudinal positions of said first, second and third ports substantially corresponding to said three positions of tilt of said bucket, said piston head having a depth sufficient to close said third port when disposed thereover, means manually operable to three positions corresponding to said three positions of tilt to selectively and interchangeably deliver high-pressure hydraulic fluid to either of said first and second ports, while selectively and interchangeably removing low-pressure hydraulic fluid from another of said ports, and while checking the remaining one of said ports to the passage of any hydraulic fluid therefrom and thereto so that said bucket is selectively tilted to said three positions of tilt.

10. In a loader having a vehicle, a digging bucket, a boom pivotally mounted at one end thereof on said vehicle, means pivotally interconnecting the other end of said boom with said bucket, extensible link means pivotally connected between said vehicle and said bucket for tilting said bucket to three positions relative to said boom, said extensible link means comprising a hydraulic ram having three ports formed through the cylinder thereof longitudinally thereof, the longitudinal positions of said three ports substantially corresponding to said three positions of tilt of said bucket, a hydraulic valve for controlling the operation of said hydraulic ram, said valve comprising a plurality of ports, hydraulic fluid conduits interconnecting said hydraulic ram ports with certain ones of said valve ports, and means manually operable to three positions corresponding to said three positions of tilt of said bucket to selectively and interchangeably cause certain selected ones of said plurality of ports to act as delivery ports for hydraulic fluid to said hydraulic ram, while causing certain other ones of said plurality of ports to act as return ports for hydraulic fluid from said ram, and while causing the remaining ones of said plurality of ports to act as checked ports for hydraulic fluid from said hydraulic ram so that said bucket is selectively tilted to said three positions of tilt.

11. In a loader having a vehicle, a digging bucket, a boom pivotally mounted at one end thereof on said vehicle, means pivotally interconnecting the other end of said boom with said bucket, extensible link means pivotally connected between said vehicle and said bucket for tilting said bucket to three positions relative to said boom, said extensible link means comprising a hydraulic ram having three ports formed through the cylinder thereof longitudinally thereof, the longitudinal positions of said three ports substantially corresponding to said three positions of tilt of said bucket, a hydraulic valve for controlling the operation of said hydraulic ram, said hydraulic valve comprising a high-pressure hydraulic fluid-supply port, a low-pressure hydraulic fluid reservoir-return port, and a plurality of ports therein, hydraulic fluid conduits interconnecting said hydraulic ram ports with certain ones of said plurality of ports, and means associated with said supply port, said return port, and said plurality of ports and manually operable to three positions corresponding to said three positions of tilt to selectively and interchangeably interconnect certain selected ones of said plurality of ports and said supply port, while interconnecting certain other ones of said plurality of ports and said reservoir-return port, and while closing the remaining ones of said plurality of ports to the passage of any hydraulic fluid therethrough so that said bucket is selectively pivoted to said three positions of tilt.

12. In a power loader carrying a digging bucket which is pivotable to a dumping position, a carrying position, and a certain intermediate digging position, manually operable means for pivoting said bucket to index said bucket in said dumping position, said carrying position, and said certain intermediate digging position, said manually operable means comprising a hydraulic ram mounted between said power loader and said bucket for pivoting said bucket, said hydraulic ram comprising a longitudinal cylinder, a piston comprising a piston head and a piston rod slidably mounted within said cylinder, a first port formed through said cylinder substantially at the head end thereof, a second port formed through the cylinder substantially at the rod end thereof, and a third port formed through said cylinder intermediate the ends thereof in a position longitudinally of said cylinder so that when said piston head is positioned over said third port said bucket is pivoted to said certain intermediate digging position, and hydraulic means connected to said first, second and third ports and manually operable to three positions corresponding to said dumping, carrying and intermediate digging positions to operate said hydraulic ram to index said bucket in said dumping position, said carrying position and said certain intermediate digging position.

References Cited in the file of this patent

UNITED STATES PATENTS

| | | |
|---|---|---|
| 1,495,058 | Wille | May 20, 1924 |
| 2,244,213 | Patton | June 3, 1941 |
| 2,359,802 | Stephens | Oct. 10, 1944 |
| 2,362,944 | Stephens | Nov. 14, 1944 |
| 2,482,612 | Drott et al. | Sept. 20, 1949 |
| 2,501,328 | Gurries | Mar. 21, 1950 |
| 2,542,082 | Hodgson | Feb. 20, 1951 |
| 2,643,674 | Lapsley | June 30, 1953 |
| 2,651,324 | Hodgson et al. | Sept. 8, 1953 |
| 2,661,724 | Blenkle | Dec. 8, 1953 |
| 2,675,785 | Ford | Apr. 20, 1954 |